United States Patent
Stoll et al.

(10) Patent No.: US 9,799,046 B2
(45) Date of Patent: Oct. 24, 2017

(54) ZERO CLICK COMMERCE SYSTEMS

(71) Applicant: Wal-Mart Stores, Inc., Bentonville, AR (US)

(72) Inventors: Nathan Stoll, San Francisco, CA (US); Andrew Ellerhorst, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 860 days.

(21) Appl. No.: 13/896,310

(22) Filed: May 16, 2013

(65) Prior Publication Data
US 2013/0311324 A1 Nov. 21, 2013

Related U.S. Application Data

(60) Provisional application No. 61/648,564, filed on May 17, 2012, provisional application No. 61/648,566, (Continued)

(51) Int. Cl.
*G06Q 30/00* (2012.01)
*G06Q 30/02* (2012.01)
(Continued)

(52) U.S. Cl.
CPC ..... *G06Q 30/0214* (2013.01); *G06Q 30/0631* (2013.01); *G06Q 30/0635* (2013.01); (Continued)

(58) Field of Classification Search
CPC .................. G06Q 30/0601–30/0645
(Continued)

(56) References Cited

U.S. PATENT DOCUMENTS

| | | |
|---|---|---|
| 5,550,576 A | 8/1996 | Klosterman |
| 5,983,004 A | 11/1999 | Shaw et al. |

(Continued)

FOREIGN PATENT DOCUMENTS

| | | |
|---|---|---|
| JP | 2004/326634 | 11/2004 |
| JP | 2007/249833 | 9/2007 |

(Continued)

OTHER PUBLICATIONS

Talisma email and answer product combo addresses volume email challenges. (Jul. 31, 2008). Business Wire Retrieved from https://dialog.proquest.com/professional/professional/docview/677381891?accountid=142257.*

(Continued)

*Primary Examiner* — Resha Desai
(74) *Attorney, Agent, or Firm* — Bryan Cave LLP

(57) ABSTRACT

In accordance with some implementations, a method for enabling clickless purchasing is disclosed. The method is performed on a server system having one or more processors and memory storing one or more programs for execution by the one or more processors. The server system detects commercial intent from a user of the computer system. In response to detecting commercial intent, the server system determines a product relevant to the detected commercial intent of a user. The server system sends a recommendation message to the user, wherein the recommendation message includes an option to purchase the product. The server system then receives a response message from the user, the message including authorization from the user to purchase the recommended product. The server system then purchases the recommended product on behalf of the user and delivers the purchased product to the user.

22 Claims, 7 Drawing Sheets

Related U.S. Application Data filed on May 17, 2012, provisional application No. 61/648,569, filed on May 17, 2012, provisional application No. 61/648,578, filed on May 17, 2012, provisional application No. 61/648,582, filed on May 17, 2012, provisional application No. 61/648,588, filed on May 17, 2012, provisional application No. 61/648,591, filed on May 17, 2012, provisional application No. 61/688,655, filed on May 18, 2012.

(51) Int. Cl.
    *G06Q 50/00*     (2012.01)
    *G06Q 30/06*     (2012.01)
    *H04L 29/08*     (2006.01)
    *H04L 12/58*     (2006.01)
    *H04W 4/20*     (2009.01)

(52) U.S. Cl.
CPC ......... *G06Q 30/0641* (2013.01); *G06Q 50/01* (2013.01); *H04L 51/046* (2013.01); *H04L 51/32* (2013.01); *H04L 67/10* (2013.01); *H04L 67/306* (2013.01); *H04W 4/206* (2013.01)

(58) Field of Classification Search
USPC .............................................. 705/26.1–27.2
See application file for complete search history.

(56) References Cited

U.S. PATENT DOCUMENTS

| | | |
|---|---|---|
| 6,185,221 B1 | 2/2001 | Aybay |
| 6,912,588 B1 | 6/2005 | Jardin |
| 7,092,381 B2 | 8/2006 | Carlsson et al. |
| 7,330,895 B1 | 2/2008 | Horvitz |
| 7,831,439 B1 | 11/2010 | Bryar et al. |
| 7,925,542 B2 | 4/2011 | Shah |
| 8,064,342 B2 | 11/2011 | Badger |
| 8,095,521 B2 | 1/2012 | Chan et al. |
| 8,170,897 B1 | 5/2012 | Cohen et al. |
| 8,224,823 B1 | 7/2012 | Amacker |
| 8,612,208 B2 | 12/2013 | Cooper |
| 8,626,604 B1 | 1/2014 | Gandhi |
| 8,739,016 B1 | 5/2014 | Goldman et al. |
| 8,935,192 B1 | 1/2015 | Ventilla et al. |
| 2001/0011235 A1 | 8/2001 | Kim et al. |
| 2001/0016496 A1 | 8/2001 | Lee |
| 2002/0099653 A1 | 7/2002 | De Souza et al. |
| 2002/0120581 A1* | 8/2002 | Schiavone ............ G06Q 10/107 705/64 |
| 2003/0046173 A1 | 3/2003 | Benjier |
| 2003/0054827 A1 | 3/2003 | Schmidl et al. |
| 2003/0056216 A1 | 3/2003 | Wugofski et al. |
| 2003/0074253 A1* | 4/2003 | Scheuring ........... G06Q 30/0201 705/7.33 |
| 2003/0149580 A1 | 8/2003 | Moores |
| 2003/0188252 A1 | 10/2003 | Kim et al. |
| 2004/0117482 A1 | 6/2004 | Salazar |
| 2004/0117860 A1 | 6/2004 | Yi et al. |
| 2005/0004837 A1 | 1/2005 | Sweeney et al. |
| 2005/0187883 A1 | 8/2005 | Bishop |
| 2006/0047598 A1 | 3/2006 | Hansen |
| 2006/0277591 A1 | 12/2006 | Arnold et al. |
| 2007/0043583 A1* | 2/2007 | Davulcu ............. G06F 17/30864 705/1.1 |
| 2007/0143816 A1 | 6/2007 | Gupta et al. |
| 2007/0199019 A1 | 8/2007 | Angiolillo et al. |
| 2007/0219880 A1 | 9/2007 | Stone et al. |
| 2007/0266097 A1 | 11/2007 | Harik et al. |
| 2008/0065445 A1 | 3/2008 | Livesay et al. |
| 2008/0271080 A1 | 10/2008 | Gossweiler et al. |
| 2008/0300940 A1 | 12/2008 | Aravamudan |
| 2009/0013053 A1* | 1/2009 | Wehner ............. G06F 17/30867 709/206 |
| 2009/0019484 A1 | 1/2009 | Jo et al. |
| 2009/0106366 A1 | 4/2009 | Virtanen et al. |
| 2009/0171760 A1 | 7/2009 | Aarnio |
| 2009/0175214 A1 | 7/2009 | Sfar et al. |
| 2009/0190544 A1 | 7/2009 | Meylan et al. |
| 2009/0222873 A1 | 9/2009 | Einarsson |
| 2009/0228339 A1 | 9/2009 | Wolf |
| 2009/0234749 A1 | 9/2009 | Fjellanger et al. |
| 2009/0276284 A1 | 11/2009 | Yost |
| 2009/0319436 A1 | 12/2009 | Andra et al. |
| 2010/0049654 A1 | 2/2010 | Pilo |
| 2010/0235256 A1 | 9/2010 | Kang |
| 2010/0279618 A1 | 11/2010 | Morton et al. |
| 2010/0312724 A1 | 12/2010 | Pinckney |
| 2011/0131106 A1 | 6/2011 | Eberstadt et al. |
| 2011/0173056 A1 | 7/2011 | D'Alessio et al. |
| 2011/0225048 A1 | 9/2011 | Nair |
| 2011/0255448 A1 | 10/2011 | Hartman et al. |
| 2011/0276377 A1 | 11/2011 | Kim |
| 2011/0276631 A1 | 11/2011 | Schmitt |
| 2011/0282941 A1 | 11/2011 | Chan et al. |
| 2011/0320373 A1 | 12/2011 | Lee et al. |
| 2012/0005209 A1 | 1/2012 | Rinearson et al. |
| 2012/0016678 A1 | 1/2012 | Gruber et al. |
| 2012/0065884 A1 | 3/2012 | Sung et al. |
| 2012/0095862 A1* | 4/2012 | Schiff ................... G06Q 30/06 705/26.7 |
| 2012/0109781 A1 | 5/2012 | Felt |
| 2012/0109792 A1 | 5/2012 | Eftekhari |
| 2012/0117584 A1 | 5/2012 | Gordon |
| 2012/0136756 A1 | 5/2012 | Jitkoff et al. |
| 2012/0163309 A1 | 6/2012 | Ma et al. |
| 2012/0170534 A1 | 7/2012 | Kim et al. |
| 2012/0197979 A1 | 8/2012 | Palm |
| 2012/0203832 A1 | 8/2012 | Vastardis et al. |
| 2012/0209839 A1 | 8/2012 | Andrews et al. |
| 2012/0278625 A1 | 11/2012 | Narayanan et al. |
| 2012/0290399 A1 | 11/2012 | England |
| 2012/0296978 A1 | 11/2012 | Inoue |
| 2012/0303425 A1 | 11/2012 | Katzin et al. |
| 2012/0330980 A1 | 12/2012 | Rubin et al. |
| 2013/0054407 A1 | 2/2013 | Sabur |
| 2013/0060625 A1 | 3/2013 | Davis et al. |
| 2013/0073989 A1 | 3/2013 | Harris |
| 2013/0094537 A1 | 4/2013 | Hui et al. |
| 2013/0097056 A1 | 4/2013 | Sun et al. |
| 2013/0097142 A1 | 4/2013 | Kim et al. |
| 2013/0124357 A1 | 5/2013 | He et al. |
| 2013/0178239 A1 | 7/2013 | Roberts et al. |
| 2013/0179440 A1 | 7/2013 | Gordon |
| 2013/0291007 A1 | 10/2013 | Shimy et al. |
| 2013/0332307 A1 | 12/2013 | Linden |

FOREIGN PATENT DOCUMENTS

| | | |
|---|---|---|
| JP | 2009/123192 | 6/2009 |
| JP | 2011/170471 | 9/2011 |
| KR | 2001/0076971 | 8/2001 |
| KR | 2002/0090816 | 12/2002 |
| KR | 10/0825204 | 4/2008 |
| KR | 2011/0117475 | 10/2011 |
| WO | WO 2010/099632 | 9/2010 |

OTHER PUBLICATIONS

"Propagation of Trust and Distrust." Guha, R.; Kumar, Ravi; Raghavan, Prabhakar; Tomkins, Andrew. WWW '04 Procedding of the 13th International Conference on World Wide Web. pp. 403-412. Mar. 2004.

Blake, P. (1997), Exploring the news, Information World Review, (121), 17-18, Retrieved from http://search.proquest.com/docview/199371966?accountid=14753.

Luvocracy Inc, International Search Report and Writtten Opinion, PCT/US2013/041700, Sep. 17, 2013, 14 pgs.

Luvocracy Inc., International Search Report and Written Opinion, PCT/US2013/041702, Aug. 27, 2013, 12 pgs.

(56) References Cited

OTHER PUBLICATIONS

Luvocracy Inc., International Search Report and Written Opinion, PCT/US2013/041705, Aug. 27, 2013, 12 pgs.
Luvocracy Inc., International Search Report and Written Opinion, PCT/US2013/041707, Aug. 27, 2013, 10 pgs.
Luvocracy Inc., International Search Report and Written Opinion, PCT/US2013/041714, Aug. 27, 2013, 11 pgs.

\* cited by examiner

ZERO CLICK COMMERCE SYSTEMS

RELATED APPLICATIONS

This application is claims priority to the following (1) U.S. Provisional Application Ser. No. 61/648,564, filed May 17, 2012, entitled "Progressively Asking for Increasing Amounts of User and Network Data"; (2) U.S. Provisional Application Ser. No. 61/648,566, filed May 17, 2012, entitled "Conversational Interfaces"; (3) U.S. Provisional Application Ser. No. 61/648,569, filed May 17, 2012, entitled "Universal Communications Infrastructure"; (4) U.S. Provisional Application Ser. No. 61/648,578, filed May 17, 2012, entitled "Trust Graph"; (5) U.S. Provisional Application Ser. No. 61/648,582, filed May 17, 2012, entitled "Universal Consumption Service"; (6) U.S. Provisional Application Ser. No. 61/648,588, filed May 17, 2012, entitled "Reward Structures"; (7) U.S. Provisional Application Ser. No. 61/648,591, filed May 17, 2012, entitled "System and Method for Social Network Based Referrals"; (8) U.S. Provisional Application Ser. No. 61/688,655, filed May 18, 2012, entitled "System and Method for Social Network Based Referrals"; which are incorporated herein by reference in their entirety.

This application is also related to the following (1) U.S. application Ser. No. 61/648,564, filed May 17, 2012 entitled "Progressively Asking for Increasing Amounts of User and Network Data"; (2) U.S. application Ser. No. 61/648,566, filed May 17, 2012, entitled "Conversational Interfaces"; (3) U.S. application Ser. No. 61/648,569, filed May 17, 2012, entitled "Universal Communications Infrastructure"; (4) U.S. application Ser. No. 13/769,181, filed Feb. 15, 2013, entitled "Trust Graph"; (5) U.S. application Ser. No. 61/648,582, filed May 17, 2012, entitled "Universal Consumption Service"; (6) U.S. application Ser. No. 61/648,588, filed May 17, 2012, entitled "Reward Structures"; (7) U.S. application Ser. No. 61/648,591, filed May 17, 2012, entitled "Pre-Establishing Purchasing Intent for Computer Based Commerce Systems" entitled "System and Method for Social Network Based Referrals"; which are incorporated herein by reference in their entirety.

TECHNICAL FIELD

The disclosed implementations relate to the field of online commerce generally and in particular to providing convenient commerce interactions for users.

BACKGROUND

Over the last two decades, the buying and the selling of products through computer networks such as the Internet have increased dramatically. A significant portion of all commerce is now conducted online through the Internet. As the amount of commerce conducted online grows, the number of online commerce venues also grows. As such, online vendors compete with each other to offer users the best user experience. One way to differentiate from other online retails is to provide the most convenient user experience.

One major source of inconvenience while shopping for products with online vendors is payment. In contrast to physical stores, where payment is a simple exchange of currency or a swipe of a card, purchasing goods online requires the user to fill out forms for payment type, delivery address, and billing address, at the very least. Reducing the extra time and inconvenience of filling out online forms is one way to improve the convenience associated with the user experience of purchasing goods and services online.

SUMMARY

In accordance with some implementations, a method for enabling a user to pre-establish intent is disclosed. Allowing a user of a system to pre-establish intent results in a significantly improved user experience, as a user can establish products/services the user wants and a commerce system will automatically purchase the product or service when it becomes available. Once established, the user's purchasing intent can be used to purchase a single item, several products within a category, or even all products recommended by specific user or made by a particular company. Furthermore, purchasing intent data stored for a user can be integrated into the user's profile to help a commerce system to improve the level of customization and enhance the user experience.

In some implementations, a commerce system stores user data. Each user can indicate products or service that he or she would like to purchase. The system stores the pre-established intent, along with any other associated attributes, such as price or size. The system can then search an established database of products or product recommendations, as well as new products as they are added to determine if any match the specifications of pre-established intent. Once a matching product is found, it can be purchased on behalf of the users and delivered without the need for user input. Thus, a user is able to set a preference once, and receive the product they are looking for without having to constantly monitor several different vendors. For example, if a user wants to purchase a specific graphics processing unit (GPU) at a particular price, they can establish that purchasing intent with the system. Once a matching product is found, the product is automatically purchased, without the need for the user to constantly monitor multiple vendors to see if a good sale has occurred.

In some implementations, a user can establish intent to purchase a particular product on a periodic basis. For example, a user may elect to purchase one bottle of wine per week. The system records the pre-established intent and finds, purchased, and delivers a matching product as established without further user intervention. The user can, of course, alter the pre-established intent at any time.

In some implementations, the commerce system allows a user to make a purchase, without ever having to "click" or interact with a web site. The commerce system determines commercial intent for a user. This commercial intent can be based on previous interactions with the commerce system. In some implementations, the commercial intent is determined based on information posted publicly by the user on a social networking site. The commerce system then determines one or more products that meet the determined commercial intent. In some implementations, the commerce system then sends a recommendation to the user through first communication channel. For example, the commerce system may send a text message to a user recommending a product.

In some implementations, the user can then respond to the recommendation through the same communication through which the recommendation was received. For example, if the recommendation was received through a text message, the user can send instructions to purchase the product through a text message. In this way, user's can make purchasing decisions without having to log onto a computer.

In accordance with some implementations, a method for enabling clickless purchasing is disclosed. The method is performed on a server system having one or more processors and memory storing one or more programs for execution by the one or more processors. The server system detects commercial intent from a user of the computer system. In response to detecting commercial intent, the server system determines a product relevant to the detected commercial intent of a user. The server system sends a recommendation message to the user, wherein the recommendation message includes an option to purchase the product. The server system then receives a response message from the user, the message including authorization from the user to purchase the recommended product. The server system then purchases the recommended product on behalf of the user and delivers the purchased product to the user.

In accordance with some implementations, a server system for enabling clickless purchasing is disclosed. The server system has one or more processors, and memory storing one or more programs to be executed by the one or more processors. The one or more programs include instructions for detecting commercial intent from a user of the computer system. In response to detecting commercial intent, the one or more programs include instructions for determining a product relevant to a user. The one or more programs include instructions for sending a recommendation message to the user, wherein the recommendation message includes an option to purchase the product. The one or more programs include instructions for receiving a response message from the user, the message including authorization from the user to purchase the recommended product. The one or more programs include instructions for purchasing the recommended product on behalf of the user and delivering the purchased product to the user.

In accordance with some implementations, a non-transitory computer readable storage medium storing one or more programs configured for execution by a server system is disclosed. The one or more programs also include instructions for detecting commercial intent from a user of the computer system. In response to detecting commercial intent, the one or more programs include instructions for determining a product relevant to a user. The one or more programs include instructions for sending a recommendation message to the user, wherein the recommendation message includes an option to purchase the product. The one or more programs include instructions for receiving a response message from the user, the message including authorization from the user to purchase the recommended product. The one or more programs include instructions for purchasing the recommended product on behalf of the user and delivering the purchased product to the user.

In accordance with some implementations, a method for using recommendations to fulfill pre-established purchasing intent is disclosed. The method is performed on a server system having one or more processors and memory storing one or more programs for execution by the one or more processors. The server system receives a recommendation for a product or service from a first user. The server system determines whether a second user has pre-indicated intent to purchase a product or service in a category of product or service that includes the recommended product or service. The server system then, in accordance with a determination that a second user has pre-indicated intent to purchase a product or service that matches the category of product or service of the recommended product or service, purchases the recommended product on behalf of the user without further input from the user.

In accordance with some implementations, a server system using recommendations to fulfill pre-established purchasing intent is disclosed. The server system has one or more processors, and memory storing one or more programs to be executed by the one or more processors. The one or more programs include instructions for receiving a recommendation for a product or service from a first user. The one or more programs include instructions for determining whether a second user has pre-indicated intent to purchase a product or service in a category of product or service that includes the recommended product or service. The one or more programs include instructions for, in accordance with a determination that a second user has pre-indicated intent to purchase a product or service that matches the category of product or service of the recommended product or service, purchasing the recommended product on behalf of the user without further input from the user.

In accordance with some implementations, a non-transitory computer readable storage medium storing one or more programs configured for execution by a client system is disclosed. The one or more programs include instructions for receiving a recommendation for a product or service from a first user. The one or more programs include instructions for determining whether a second user has pre-indicated intent to purchase a product or service in a category of product or service that includes the recommended product or service. The one or more programs include instructions for, in accordance with a determination that a second user has pre-indicated intent to purchase a product or service that matches the category of product or service of the recommended product or service, purchasing the recommended product on behalf of the user without further input from the user.

In accordance with some implementations, a method for using recommendations to fulfill purchasing intent of a user is disclosed. The method is performed on a server system having one or more processors and memory storing one or more programs for execution by the one or more processors. The server system receives an indication of intent from a user to purchase a good or service within a specific category. The server system, based on the received indication of intent, identifies recommendations from other users of the server system for goods or services which fall within the category indicated by the users. The server system then, based on the recommendations, selecting a specific product or service and purchasing the selected product or service on the user's behalf.

In accordance with some implementations, a server system for using recommendations to fulfill purchasing intent of a user is disclosed. The server system has one or more processors, and memory storing one or more programs to be executed by the one or more processors. The one or more programs include instructions for receiving an indication of intent from a user to purchase a good or service within a specific category. The one or more programs include instructions for, based on the received indication of intent, identifying recommendations from other users of the server system for goods or services which fall within the category indicated by the users. The one or more programs include instructions for based on the recommendations, selecting a specific product or service and purchasing the selected product or service on the user's behalf.

In accordance with some implementations, a non-transitory computer readable storage medium storing one or more programs configured for execution by a server system is disclosed. The one or more programs also include instructions for receiving an indication of intent from a user to purchase a good or service within a specific category. The one or more programs include instructions for, based on the received indication of intent, identifying recommendations from other users of the server system for goods or services which fall within the category indicated by the users. The one or more programs further include instructions for, based on the recommendations, selecting a specific product or service and purchasing the selected product or service on the user's behalf.

BRIEF DESCRIPTION OF THE DRAWINGS

Like reference numerals refer to corresponding parts throughout the drawings.

DESCRIPTION OF IMPLEMENTATIONS

Figure 1:
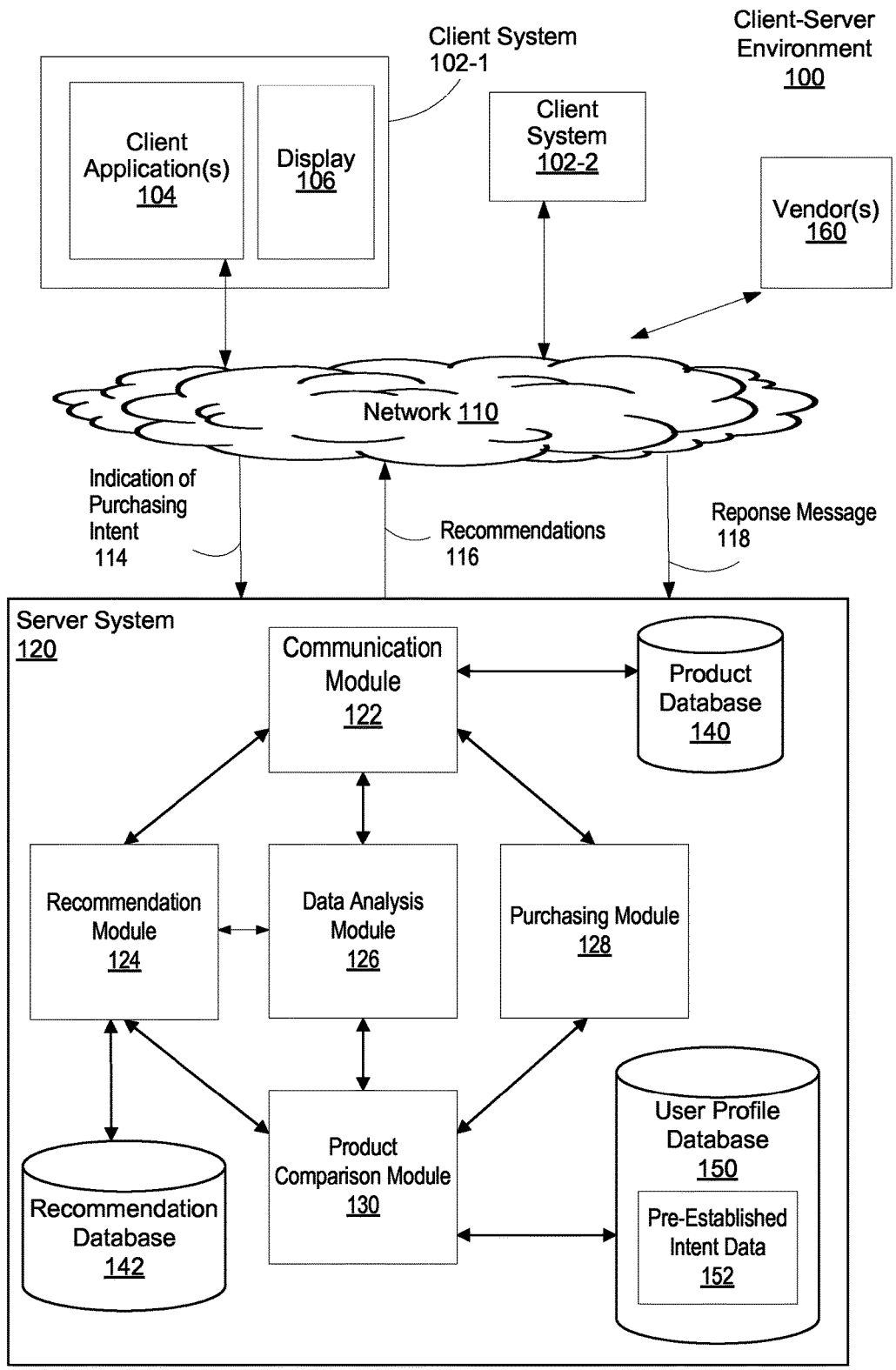
FIG. 1 is a block diagram illustrating a client-server environment in accordance with some implementations.

In some implementations, a server system operates a commerce system for allowing users to easily and quickly find and purchase goods and services that meet their specific needs and desires. In some implementations, the commerce system is available online via a web site. In some implementations, the commerce system operated by the server system leverages user relationships to improve user experience and personalize recommendations. Furthermore, the online commerce system improves the user purchasing experience by expanding the methods available to the users of the online commerce system to make purchasing decisions.

In some implementations, users of the online commerce system visit a web site operated by the online commerce system as an e-commerce portal. Users log onto the system, select products for purchase, and pay for their purchases via a web form. In some implementations, the online commerce system allows registered users to make purchasing decisions without having to visit the web site associated with the online commerce system at the time of purchase. Thus, the online commerce system allows users to make click free (or zero click) purchasing decisions. It should be noted that the terms zero click, clickless, clickless, and click free are used within the specification to indicate that the user is not required to click for the system to purchase a product or service on behalf of the user. These terms (zero click, clickless, and click free) are used interchangeably.

This application will refer to determining commercial intent and establishing purchasing intent. It should be noted that commercial intent differs from purchasing intent. Commercial intent is determined by the server system based on based on existing information the server system has gathered about the user but not based on a user's explicitly indicated intent to purchase an item. Once the user has explicitly indicated intent to purchase an item, the user has established purchasing intent. Thus, purchasing intent is intent to purchase a product or service that has been explicitly communicated from a user to the server system, either for immediate purchase request or for storage as pre-established purchasing intent.

In some implementations, the server system stores interest information for users registered with the online commerce system. In some implementations, the interest information is stored in a user interest profile. The interest information includes information detailing products and services that the user has indicated a current interest in purchasing, as well as previous purchases, recommendations, and information describing the trust relationships that the user has with other users of the server system.

In some implementations, based on stored interest information, the server system sends a recommendation message to a user that includes a recommendation to purchase a specific product. This message can be sent through the online commerce website, over email, by text message (SMS), by voice mail, through a social networking service (such as Facebook or Twitter), or any other communication method. For example, the server system sends a text message including a recommendation to user A for a pair of men's athletic shoes. In some implementations, the message includes all necessary information about the product to allow the user to make an informed decision, including but not limited to price, product specifications (size, color), brand, delivery options, payment options, or any other information stored in the product database.

In some implementations, the message includes only basic information about the product such as price and product specifications, and provides a link or other directions that allow the user to access more detailed information. In some implementations, the request includes the user's request for a specific recommender or recommending group. For example, the user submits a request for a recommendation for shoes, but specifically includes instructions that the recommendation be made by a specific friend (Megan). The system then requests that Megan make a shoe recommendation. In some implementations, the requested recommender is mandatory (i.e. the user will only accept recommendations for that user or group of users). In other implementations, the requested recommender is preferred by not mandatory.

In some implementations, recommendations made by a user of the server system have a corresponding strength. For example, a user submitting a recommendation chooses a value from 1 to 5, 5 being the strongest possible recommendation and 1 being the weakest possible recommendation. Strong recommendations (those with a high recommendation value) are more likely to be transmitted to a user than weaker recommendations.

In some implementations, the user requests recommendations from the server system. The requests can be sent to the server system by any communication method. For example, a user can send an email to the server system requesting recommendations for men's shoes. In some implementations, the request sent by the user includes additional information, such as budget information, product specification, delivery options, and payment directions. In some implementations, the request sent to the server system includes natural language. For example, a message sent to the server system could include the request "I'd like to buy some black formal men's shoes for less than $200." In some implementations, the server system parses the natural language to determine the user request.

In some implementations, the user responds to the recommendation message received from the server system through a response message. In some implementations, the user responds message is sent using the same communication method that was used to send the recommendation message. For example, if the recommendation message from the server system was sent as a text message, the user may respond with a text message. In other implementations, the user responds to a recommendation message using a different communication method than was used to send the recommendation message. For example, if the recommendation message is delivered to the user via a voice message, the user may chose to respond via a text message, especially if he or she is in a place where speaking on the phone would be undesirable. In another example, the recommendation message is delivered as a text message, but the user logs onto the commerce website and responds using the sites internal message system. This may allow the user to see more details before deciding how to respond.

In some implementations, the recommendation message includes a unique recommendation code that allows the user to respond to the specific recommendation message through any medium simply by including the correct recommendation code. For example, a recommendation voicemail includes a unique recommendation code. If the user wants to respond to that recommendation message via text, he or she can include the unique recommendation code in the text message to specify the recommendation to which the user is responding. This will prevent errors caused by incorrectly identifying the recommendation message to which the user is responding.

In some implementations, the server system stores contact information for each user registered with the server system. In some implementations, the contact information is stored in a user profile associated with the user. Contact information for a respective user includes a list of approved methods for communicating with that respective user based on information submitted by the user and well as the address, number, or ID needed to contact the user through that method. For example, the contact information for User A includes an email address, a phone number, an instant messaging service ID number, and physical address, and a commerce web site identification number. In some implementations, a user contacts the server system though a communication method or account that the user has not previously submitted to the server system. In this case, the server system stores contact information for the user that the user has not explicitly submitted, but will only use this information to associate incoming messages with the appropriate user, unless the user explicitly authorizes the server system to communicate through the new communication method or account.

In some implementations, when the server system needs to transmit a recommendation message to a user, the server system determines the best mode of communication from the stored contact information and stored user preferences. For example, the user might indicate that text messaging is the best mode of communication for reaching the user on weekends. Thus, the server system selects a text message to deliver the recommendation message on a Saturday. In some implementations, the server system can check to determine if the user is currently logged onto one of the social media accounts of the user and then can use a communication method associated with that social media account to transmit a message to the user.

In some implementations, the server system then sends the recommendation message over the determined mode of communication. In some implementations, the recommendation message sent by the server system includes a notification that the recommendation will expire after a certain amount of time. For example, the recommendation may include a sale price for a product that will no longer be available after a certain time or that the product will be sold out and the server system will only reserve a product for a limited amount of time. In some implementations, if no response is received by the end of the limited period of time, the server system determines that the user did not want the recommended item. In some implementations, a user's profile is updated to include information on the products or services that the user either did not respond to or responded with a decision not to purchase.

In some implementations, the server system receives a response to a recommendation message. In some implementations, the server system first identifies the user from whom the response is received by the source of the message (email address, phone number, etc), a unique user identification code included in the response, or the unique recommendation code included in the response.

In some implementations, the server system analyzes the received response to determine if the user desires to purchase the recommended product or service. In some implementations, the user indicates that the server system should purchase the recommended product by including a simple predetermined text or oral directive such as "Buy," "Yes," or "Purchase." In some implementations, the server system specifically designates the specific written or oral phrases that it accepts as indicating a desire to purchase. In some implementations, the approval options are specifically designated in the recommendation message. In other implementations, the user is able to customize his or her own approval messages.

In some implementations, the received response includes a secret personal identification number (PIN) to ensure that the response actually comes from the registered user to whom the recommendation message was sent. In some implementations, the response message must also include the unique recommendation code to ensure that the server system identifies the correct recommendation message to which the response message corresponds. In some implementations, the response message also identifies the method of payment the user wishes to use. In some implementations, a user's profile includes information detailing the user's default method of payment (e.g. a credit card on file) that is to be used when no payment method is explicitly listed. In some implementations, the server system collects payment information from the user prior to sending any recommendations to the user and then uses the received payment information in all transactions until notified to do otherwise by the user.

In some implementations, once the system server receives a response message from a user, verifies the identity of the user (with a secret personal identification code, for example) and correctly identifies the recommendation message to which the received response message is responding, the server system then purchases the recommended product on behalf of the user. In this way, users can respond to a recommendation message by whatever communication method is currently convenient without having to follow the purchase procedure typical of modern commerce websites. For example, during a holiday shopping season, a retailer temporarily marks down a popular product in limited quantity. These products often sell out quickly, and thus become unavailable to users who do not constantly monitor the retailer's sales. If a product the user is interested in comes on sale and is likely to sell out quickly, the server system can quickly send a recommendation message to the user via any communication method that the user has registered with the server system (text, e-mail, twitter messages, telephone calls) and the user can conveniently respond in time to claim the desired product at the reduced sales price from wherever they are.

In some implementations, the server system receives an indication of intent to purchase a particular good or service from a user of the server system. The server system stores that indication of intent. In some implementations, the indication of intent specifies a particular product. In other implementations, the indication of intent only specifies a class or category of product or service.

In some implementations, the indication of intent specifies a maximum budget for the purchase. In other implementations, a user profile includes a total budget for all purchases made but particular indications of intent do not have specific budgets. In some implementations, the server system itself stores a particular amount of currency from which purchases may be made. In some implementations, the user and the indication of intent do not have a maximum budget.

In some implementations, the indication of intent is a message from the user to the server system describing a product the user wishes to purchase. For example, the server system may receive a text message from a user indicating the user wants to buy a copy of "Breaking Bad Season 1." In some implementations, the sent indication uses natural language. For example, an indication of intent may read "Looking to buy season 1 of Breaking Bad." The server system parses the natural language request and responds accordingly.

In some implementations, the server system does not receive a direct request from a user, but infers commercial intent from information available to the server system. In some implementations, the server system can infer commercial intent from publicly available social media data. For example, if the user has associated their twitter account with their user profile, the server system can monitor twitter messages by the user. If a message reads "Oh no! just broke my headphones. I loved those things ☹ ." The server system infers that the user is now looking to purchase new headphones. The server system can then request recommendations in the "headphones" category to be sent to the user. In some implementations, commercial intent is inferred from a user's search and browsing history.

In some implementations, when the server system detects commercial intent in natural language, the server system must process the text of the commercial intent to determine a matching product or category of product. The server system can use any appropriate matching algorithm to find an appropriate match. For example, in some implementations, the server system employs a matching system with fixed hierarchical product category taxonomy and then tries to match the text (e.g., natural language text) with one of the predefined categories. In other implementations, the server system uses a more flexible system. Rather than defining strict predefined categories, the server system defines rules or algorithms for determining doing this will all look like statistical estimates of similarity (e.g., a very simple example is calculating the Levenstein distance between two strings). It should be noted that even though two types of algorithms have been listed, any suitable algorithm will work.

In some implementations, the server system includes a hierarchical product category taxonomy that includes all possible product categories and stores their relationship to each other. For example, music is a broad category and country music and rap music are narrower sub categories within the hierarchical taxonomy. In other implementations, the system does not include a hierarchical product category taxonomy.

In some implementations, when the server system detects commercial intent or receives purchasing intent, the server system matches the commercial intent or the purchasing intent to one or more products stored in a product database. This matching can be accomplished using any suitable matching algorithm. In some implementations, the server system uses intent includes a category of product. In some implementations, the category is explicitly included by the user when they send the purchasing intent. For example, the user can explicitly request a book in the category "Thrillers." In other implementations, the user submits a request that includes natural language rather than explicitly indicating a particular product category. In this case, the server system parses the natural language request to determine one or more product categories that are associated with the request. For example, a user request for "noise-canceling headphones" can be parsed and several categories, such as "Electronics," "Music," or "Office/Productivity" are associated with the natural language request.

In some implementations, if more than one category is associated with a request, the server system chooses one as the most preventatives category. In other implementations, the server system uses each category separately and then compares the results to find products exist in the potential match list of all of the categories. In yet other implementations, the server system uses all the categories at once to find the product that best matches all the associated categories. In some implementations, once the server system has determined one or more categories associated with a purchasing or commercial intent, the server system uses the one or more product categories to identify relevant products. The category can be of any level within the hierarchical category taxonomy. In some implementations, the detected or received intent specifies a very broad category of product (e.g., men's shoes). In other implementations, the detected or received intent specifies a narrow category of product (e.g. men's running shoe size 12 with a built in pedometer). In some implementations, the server system includes a hierarchical category taxonomy that includes all possible product categories and stories them to each other. In some implementations, the received or detected intent specifies a particular product, but allows the server system to choose the specific product options. For example, the intent specifies an iPod but not the model, capacity, or price. The server system then chooses the best product based on the stored user information.

In some implementations, the server system uses a flexible statistical matching algorithm. In this case there are no predetermined categories. Instead, each new request is converted into a new bucket, and a statistical measure of its distance from other buckets is determined user statistical estimates of similarity/distance using n-dimensional math within infinite or pseudo-infinite semantic spaces. Once the distances are calculated, the server system selects one or more close products or categories.

In some implementations, the received indication of intent to purchase includes a list of product characteristics. For example, if the server system receives an indication of intent to purchase a woman's evening dress, the indication of intent may specify size, color, or any other characteristic of the product.

In some implementations, the server system determines whether any products or recommendations for products currently stored by the server system match or satisfy the specific purchasing intent indicated by the user. In accordance with a determination that a product or recommendation for a product matches or satisfies the received indication of purchasing intent, the server system purchases the product on behalf of the user. In some implementations, the server system purchases the product without any additional user intervention. For example, if the server system receives an indication from a user that the user intends to purchase a pair of running shoes for between $85 and $150 in men's size 12 in red, the server system determines whether any product or recommendation stored at the server system matches those specifications. If a pair of red running shoes in size 12 in men's sizes for between $85 and $150 is found, the server system then purchases the shoes for the user.

In some implementations, the user can specify that the server system does not need to locate an exact match. The user can specify which aspects of the product are required and which are only preferred. In some implementations, the user can specify specific alternatives. For example, a user requests a pair of shoes and specifies a price range, a size, and a color. The user indicates that the indicated price range and the size of the shoes are required to match exactly, but that the color is only preferred and thus an exact match for color is not necessary. In some implementations, the user lists black, dark grey, and dark brown. The server system then only needs to find shoes that match one of the listed colors.

In some implementations, the server system itself is able to determine suitable alternative products. In some implementations, if the server system cannot find a matching product, it will find the best possible match (i.e. the most number of attributes matching the desired product) and send a recommendation to the user. The user can then decide whether the recommended product is acceptable and respond accordingly.

In some implementations, if the server system determines that no currently stored recommendations exactly match the received indication of intent to purchase a product or service, the server system can solicit new recommendations from users. In some implementations, the server system selects one or more users in a first tier of potential recommenders. In some implementations, the first tier of users is selected based on social connections and recorded trust levels with the requesting user. In this way, the most trust recommenders are the first users to have the opportunity to submit a recommendation. In some implementations, the server system also factors in the success of previous recommendations when determining the users from which to solicit recommendations. For example, if User A has indicated a high trust level for User B and a medium trust level for User C, but consistently chooses the recommendations of User C over those of User B, the server system would then select User C in the first tier rather than User B. The server system sends a request for recommendations to each user in the first tier of users. In some implementations, the server system waits a predefined amount of time and, if no recommendations are received from the first tier of users, the server system sends recommendation requests to a second tier of potential recommenders.

In some implementations, when the server system determines that no currently stored product or user-generated recommendation meets the requirements of the received indication of purchasing intent, the server system stores the indication of purchasing intent in a database for future use. In some implementations, a received indication of purchasing intent includes a deadline or period of time after which the purchasing intent is no longer valid. In some implementations, the server system retains the indication of purchasing intent for future use, but marks it as currently inactive, so that no purchases will be made on the basis of the saved purchasing intent. In other implementations, the server system removes the indication of purchasing intent from the server system.

In some implementations, when the server system receives a recommendation from a user of the server system, the server system determines whether the recommendation matches any active, stored indication of purchasing intent that has not been fulfilled. In some implementations, the server system determines that the received recommendation does not match any active, stored indication of purchasing intent. In this case the server system stores the recommendation in a database for use in fulfilling future received indications of purchasing intent.

In some implementations, the server system determines that the received recommendation matches a stored indication of purchasing intent, and in response, the server system determines whether to purchase the recommended product or service on behalf of the user who has submitted the indication of purchasing intent. In some implementations, the server system determines whether to purchase the recommended product based on social relationships between the recommending user and the user who submitted the indication of purchasing intent. For example, in some cases the server system only purchases recommended products for a user based on stored indications of purchasing intent when the user has previously indicated a high level of trust for the user who recommended the product.

In some implementations, the server system only purchases products on behalf of a first user when the recommending second user is in the first user's social circle. In some implementations, the server system maintains information describing trust relationships between users and only purchases products on behalf of a first user when the server system has trust information indicating a trust relationship between the first user and the recommending second user. In some implementations, the server system only purchases a product or service if the trust level between the first user and the recommending second user is above a predetermined level. For example, the server system determines that an mp3 player recommended by user Bob matches user Alice's stored indication of purchasing intent. The server system then determines that Alice's user profile includes trust information for Bob. The server system then determines whether the stored value representing Alice's trust for Bob exceeds a predetermined level of trust. If so, the server system purchases the recommended mp3 player on Alice's behalf.

In some implementations, users of the server system designate customized purchase conditions under which the server system should automatically purchase a recommended product that matches a pre-established intent to purchase. In some implementations, customized purchase conditions are customized for each stored pre-established intent record received by the server system. In some implementations, the customized purchase conditions apply to all stored pre-established intent to purchase record. Customizable factors include the level of trust between the two parties, the number of connections between the recommender and the purchaser on a graph of the social network associated with the site, whether the current price/product is time limited, among other factors.

In some implementations, a user can pre-establish intent to purchase all the recommendations from a particular user. In other implementations, a user can pre-establish intent to purchase all products in a specific product type that are recommended by a specific group of people.

In some implementations, a user can establish a recurring request, such that the server system automatically sends a recommendation for a particular product or service on a recurring schedule, without further action with the user. In this case, the user is able to receive new recommendations in a particular category without having to submit a new request each time. For example, a user can request to get a new recommendation for a suspense novel each month. In some implementations, a user can similarly request that a particular product or category of product be purchased automatically on a recurring schedule. For example, a user can arrange to have fresh fruit purchased and delivered once a week.

In some implementations, the server system is unable to find a product within a user's budget that matches a stored pre-established intent to purchase a product. In this case, if a matching product is available, but at a price above the user's budgeted price, the server system can then transmit an offer to purchase the product at a price within the user's budget to the appropriate vendor. The vendor can then accept or refuse the offered price. If the vender accepts, the server system can then purchase the product at the offered price.

FIG. 1 is a block diagram illustrating a client-server environment 100 in accordance with some implementations. The client-server environment 100 includes one or more client systems 102-1 and 102-2, a server system 120, and one or more vendors 160, all connected over a network 110. In some implementations, the client system 102 includes one or more client applications 104 and a display 106. The server system 120 includes a communication module 122, a recommendation module 124, a data analysis module 126, a purchasing module 128, a product comparison module 130, a product database 140, a recommendation database 142, and a user profile database 150. The network 110 may consist of any one or more of any of a variety of networks, including local area networks (LAN), wide area networks (WAN), wireless networks, wired networks, the Internet, or any combination of such networks.

In accordance with some implementations, the client system 102 includes one or more client applications 104. The one or more client applications 104 include, but are not limited to, a web browsing application for connecting to the server system 120. The client system 102 also includes a display 106. In some implementations, the client system is a computing device with the display integrated directly the device itself, such as a laptop, a smart phone, and a tablet computer. In other implementations the display is connected to, but not integrated into the client system. For example, desktop computer systems often do not have an integrated display and instead connect to a standalone display.

In some implementations, the client system 102 receives a recommendation 116 from the server system 120. In some implementations, the recommendation 116 includes information identifying a recommended product or service, details further explaining the product or service, a recommendation identifier that uniquely identifies this recommendation, and, optionally, a time limit for the recommendation. In some implementations, the recommendation is received over any viable communication medium. For example, the recommendation message can be transmitted via e-mail, text, voice mail, social media message, an instant message, a message through a messaging service internal to the server system, or through the messaging service of another web service or web site.

In some implementations, if the user of the client system 102 indicates that the user desire to purchase the recommended product or service, the client system 102 responds to the recommendation 116 by sending a response message 118 to the server system 120. In some implementations, the response message 118 is returned to the sever system 120 via the same communication method that was used to send the recommendation 116. For example, if the recommendation 116 was received through an email message, the client system then uses the email messaging system to send a response message 118. In some implementations, the client system 102 user a different communication method to send a response message 118. For example, the recommendation 116 is sent as an instant message through a chat program. Instead of responding through the chat program, the user sends a response message via an email.

In some implementations, the response message 118 includes an identifier for the recommendation message 116 received by the client system 102, an identifier for the user of the client system 102, and an indication indicating whether the user wishes to purchase the recommended product or service. In some implementations, the response message 118 does not include an identifier for the user and the server system 120 determines the identity of the user based on the metadata associated with the response message 118. For example, the server system 120 can determine the user's identity based on the email address or telephone number associated with the response message 118. In some implementation, the indication indicating the user's intent to buy is a text string such as "Yes" or "Buy." In other implementations, the user indicates permission to purchase the recommended product or service by including a secret personal identification code (PIN) that is known only to the user. In some implementations, the response message 118 also includes information identifying the users preferred method of payment. In some implementations, the response message 118 is encrypted.

In some implementations, the client system 102 transmits an indication of purchasing intent 114 to the server system 120. An indication of purchasing intent 114 is information transferred to the server system 120 that includes a product or category of product (or a service or category of service) the user wishes to purchase. For example, the product is as specific as the book "Ready Player One" or as broad as "Jeans" or "Online data backup service." In some implementations, the indication of purchasing intent 114 includes information further refining the desired product or service. For example, an indication of purchasing intent 114 could include the price of the product, brands or vendors favored by the user, colors, styles, size of the product, options included with the product, quantity of the product available, material used to fabricate the product, the number of units, the pattern of the product design, whether the product is local, the level of service associated with the product, whether the vender allows custom modifications, whether the vendor allows special requests of any kind, whether the product comes with a warranty, the assembly status of the product (for example, pre-assembled, partially assembled, or unassembled), the artist or maker associated with the product, the format of the product, or the version of the product, whether the price of the product has been reduced as part of a sale, whether the product has been discontinued, a specific time frame, a discount percentage, a material, an average review score on a review website such as MetaCritic, or any other feature of a product or service. In some implementations, the each product in the product database includes some or all of the information listed above.

In accordance with some implementations, the indication of purchasing intent 114 also includes instructions for payment, such as a credit card number or bank account number. In some implementations, the server system 120 attempts to find a product or service that matches the requested features. Once a matching product is found, the server system 120 purchases the product and arranges for delivery to the user of the client system 102.

In accordance with some implementations, the server system 120 includes a communication module 122, a recommendation module 124, a data analysis module 126, a purchasing module 128, a product comparison module 130, a product database 140, a recommendation database 142, and a user profile database 150. The communication module is configured to send and receive communications over the network 110 to one or more client systems 102 and one or more vendors 160.

In accordance with some implementations, the communication module 122 handles all communication with the one or more client systems 102. In some implementations, the communication module 122 receives a recommendation 116 from the recommendation module 124 to send to a client system 102. In some implementations, the communication module 122 is able to use one or more of several different communication methods to transmit the recommendation 116 to the client system 102. The server system 120 stores contact information for each user in the user profile database 150.

In some implementations, the communication module 122 determines the communication method based on past communications with the user of the client system. Thus, the communication module 122 chooses the communication method that the user of the client system 102 uses most often when communicating with the server system. For example, if a user communicates with the server system 120 through email in 75% of communications, the server system 120 will use an email messaging system to deliver recommendations 116 to the user. In some implementations, each user selects a preferred communication method and this preference is stored in the user profile database 150. For example, a user selects text messaging as the preferred method for receiving messages and in response the communication module 122 will then use text messages to send recommendations 116 to the user, unless directed otherwise. In some implementations, the communication module 122 will use multiple communication methods to send recommendations to the user.

In some implementations, the communication module 122 chooses the communication method based on the time and date that the recommendation is to be sent. For example, the communication module 122 uses email messages to deliver recommendations 118 during the standard workday (9 am-5 pm Monday through Friday) and uses text messages to deliver recommendations 118 on the weekend and evenings. In some implementations, no recommendations will be sent during typical sleeping hours. In some implementations, each user selects time and data preferences for the communication module 122 to use and these preferences are stored in the user profile database 150.

In some implementations, the communication module 122 receives response messages 118 from client systems 102. In some implementations, each response message 118 is transmitted to the data analysis module 126. In other implementations, each response message 118 is transmitted to the recommendation module 124 before it is transmitted to the data analysis module 126. In yet other implementations, a copy of the response message 118 is transmitted to both the recommendation module 124 and the data analysis module 126.

In some implementations, the communication module 122 receives an indication of purchasing intent 114 from a client system 102. The communication module 122 transmits the indication of purchasing intent 114 to the recommendation module 124.

In accordance with some implementations, the recommendation module 124 is configured to transmit recommendations 116 to the client system 102. The recommendation module 124 determines which recommendations 116 to send to a user of a client system 102 based on known user interests, currently popular products, products chosen by editors and content customizers associated with the server system 120, and products or services recommended and/or purchased by other users of the server system 120. In some implementations, the server system 120 is more likely to recommend products to a first user that have been recommended and/or purchased by users who are socially connected to the first user. For example, if Bob's profile lists Frank as a friend, and Frank recommends a men's wear product, the server system 120 will be more likely transmit that recommendation to Bob than user Alan, whose profile does not identify Frank as a trusted friend.

In some implementations, the recommendation module 124 transmits recommendations to the communication module 122 to be sent to the client system 102 over a network 110. In some implementations, the recommendation module 124 receives response messages 118 from client systems 102 through the communication module 122. In response to receiving a response message 118, the recommendation module 124 identifies the recommendation message 116 to which the response message 118 corresponds. The recommendation module 124 transmits the response message 118 to the data analysis module 126.

In some implementations, the recommendation module 124 receives an indication of purchasing intent 114 from the communication module 122. An indication of purchasing intent 114 includes, at the very least, information describing a product, a category of product, a service, or a category of service that a user associated a client system 102 wants to purchase. The recommendation module 124 determines whether any products in the product database 140 or the recommendation database 142 match the product or service described in the indication of purchasing intent 114. In accordance with a determination that a product in the product database 140 or the recommendation database 142 matches the product or server described in the indication of purchasing intent 114, the recommendation module 124 transmits the indication of purchasing intent 114 and the information identifying the determined matching product or service to the purchasing module 128 for purchase.

In some implementations, if no products in the product database 140 or the recommendation database 142 match the product or service described in the indication of purchasing intent 114, the recommendation module 124 transmits the indication of purchasing intent 114 to the product comparison module 130. For example, if a user sends an indication of intent to purchase 114 a 128 GB solid state drive for $80 or less to the server system 120, the recommendation module 124 checks to see if any matching product is listed in the products database 140 or the recommendation database 142. If so, the purchasing module 128 purchases the product on behalf of the user of the client system 102.

In some implementations, the data analysis module 126 determines the identity of the user who sent the response message 118. In some implementations, the identity of the user can be determined by determining the communication method used to transmit the message and identifying message related metadata associated with the user. In some implementations, the metadata is a phone number, a source email address, an instant messaging ID, or other identifying metadata associated with the response message.

In some implementations, the server system 120 then matches the identified message related metadata to metadata stored for users in the user profile database 150. For example, a response message 118 received via email will have an associated source email address. The server system 120 compares the source email address against email addresses stored in the user profile database 150 and associated with specific users. When the server system 120 determines that the source email address matches an email associated with a respective user, the server system 120 is able to determine that the response message 118 is from the respective user. In other implementations, the response message 118 includes a user identification number that identifies the user that sent the response message 118. The response message may also include a secret personal identification number (PIN) that allows the data analysis module 126 to firmly establish the identity of the user who sent the response message 118. In some implementations, each recommendation has a unique recommendation code that can be used to identify the user without additional information. In other implementation, multiple users all receive the same recommendation with the same recommendation code and the data analysis module 126 relies on user ID information to identify the user.

In some implementations, the data analysis module 126 determines what action should be taken in response to receiving the response message 118. The data analysis module 126 determines whether the response message 118 includes a textual indication of the user's intent (e.g. the word "Buy"). In other implementations, the user customizes the response needed to trigger a purchase decision. For example, a user can customize the service provided by the server system 120 by establishing that a valid purchase request will include the word "coconut." This allows the user to choose a confirmation method most convenient to the user and affords an additional layer of security.

In some implementations, the purchasing module 128 is configured to receive a response message 118 from a client system 102 indicating intent to purchase a product. In some implementations, the purchasing module 128 receives this message from the communication module 122. In some implementations, the purchasing module 128 receives this response message 118 from the data analysis module 126. Based on the received message, the purchasing module 128 determines the product to be purchased. In some implementations, the purchasing module 128 selects a vendor to supply the product to be purchased. In some implementations, each product is only available from a single vendor. In other implementations, the products database 140 lists multiple possible vendors for each product. The purchasing module 128 compares prices and delivery options.

In some implementations, the purchasing module 128 then enlists the communication module 122 to purchase the desired product from the determined vendors 160 available over the network 110.

In some implementations, the product comparison module 130 receives an indication of purchasing intent 114 from the recommendation module 124. In some implementations, the product comparison module 130 analyzes the information included in the indication of purchasing intent 114 and determines acceptable alternatives to the requested item. In some implementations, acceptable alternatives are determined by allowing a percentage variance from the requested value. For example, if the indication of purchasing intent lists a 23 inch monitor for less than $200, the product comparison module 130 determines that a 22 inch monitor for less than $150 or a 24 inch monitor for less than $250 are reasonable alternatives. In some implementations, for qualities of a product that cannot be measure numerically, like color, the product comparison module 130 stores lists of common acceptable alternatives. For example, for the color red, the product comparison module 130 lists vermillion, rose, and maroon as alternatives.

In some implementations, the product comparison module 130 sends the alternatives to the recommendation module 130 to be sent to users as recommendations 116. If no alternatives can be found, or the user rejects the suggested alternatives, the indication of purchasing intent 114 is stored in the user profile database 150 as pre-established intent data 152.

In some implementations, as new user-generated recommendations are received by the recommendation module 124 and are stored in the recommendation database 142, the product comparison module 130 determines whether the user-generated recommendation matches pre-established intent data 152 for any user whose profile is stored in the user profile database 150. Similarly, when a new product is added to the product database 140, the product comparison module 130 determines whether the newly added product matches any pre-established intent data 152. In accordance with a determination that a new user-generated recommendation or product matches stored pre-established intent data 152, the product comparison module 130 sends the pre-established intent data and the matching product or recommendation data to the purchasing module 128 for purchase.

In some implementations, the product database 140 contains information for products that may be purchased through the server system 120. In some implementations the products in the product database 140 are added by partner vendors 160. In some implementations, the products in the database 140 are added by users and recommenders in the server system 120. The products database 140 includes information for each product, including, but not limited to, the price of the product, its specification (size, color, etc), the vendor or vendors from which it is available, whether the item is in stock, and whether it is available for delivery. In some implementations, the client system 102 sends a response message 116 to the server system 120 and the purchasing module 128 uses the information stored in the product database 140 to purchase the selected product. In some implementations, the product database 140 searches websites of vendors, or other databases maintained by vendors that are available over a network 110, for the desired product. The product database 140 then determines which vendor offers the most favorable terms (e.g. price, delivery, in stock) and purchases the product.

In some implementations, the recommendation database 142 stores recommendations received from users of the server system 120. In some implementations, the recommendation database 142 maintains a list of all recommendations ever made by any users of the database, how successful those recommendations were (what percentage of users purchased the recommended product when given this recommendation), whether the user who recommended the product purchased the product, and information concerning the request for recommendation that prompted the recommendation. In other implementations, only a portion of total recommendations are retained in the recommendation database 142 at any given time, based on, among other factors, how long ago the recommendation was made, whether the product is still available, the trustworthiness of the recommending user, and how popular the recommendation has been.

In some implementations the user profile database 150 contains user profiles for users who have registered to use the service provided by the server system 120. In some implementations, a user profile includes the name, ID, demographic information (gender, age, location, etc), purchasing history, social network information (including username and passwords for one or more social networking sites), and trust information. In some implementations, the user profile includes contact information submitted by the user or stored by the system after contact by the user including but not limited to email addresses, phone numbers, user names, instant message user IDs, and social networking sites user information sufficient to allow the service to access each of the user's social networking sites. The communication module 122 uses information stored in the user profile database 150 to send recommendation messages 116 to the client system 102.

In some implementations, the user profile database 150 includes pre-established intent data 152. Pre-established intent data 152 includes products and/or services that a user has previously indicated a desire to purchase. Pre-established intent data includes the product, service, or category of product or service that the user desires to purchase. In some implementations, the pre-established intent data also includes a budget for each particular product or service and/or a budget for all purchases. In some implementations, if the pre-established intent data 152 includes a budget for all items combined, the pre-established intent data 152 also includes priority data for each item to allow prioritizing of the purchases. In some implementations, a user's budget is fixed for a given time period and resets at the beginning of each time period. For example, a user may set a budget of $100 a month and then the budget will reset back to $100 at the beginning at each month, regardless of how much of the budget was used in the last month.

In some implementations, the vendors 160 are commercial organizations with products to sell. The vendors 160 can receive orders to purchase products from the server system 120 and fulfill those orders.

Figure 2:
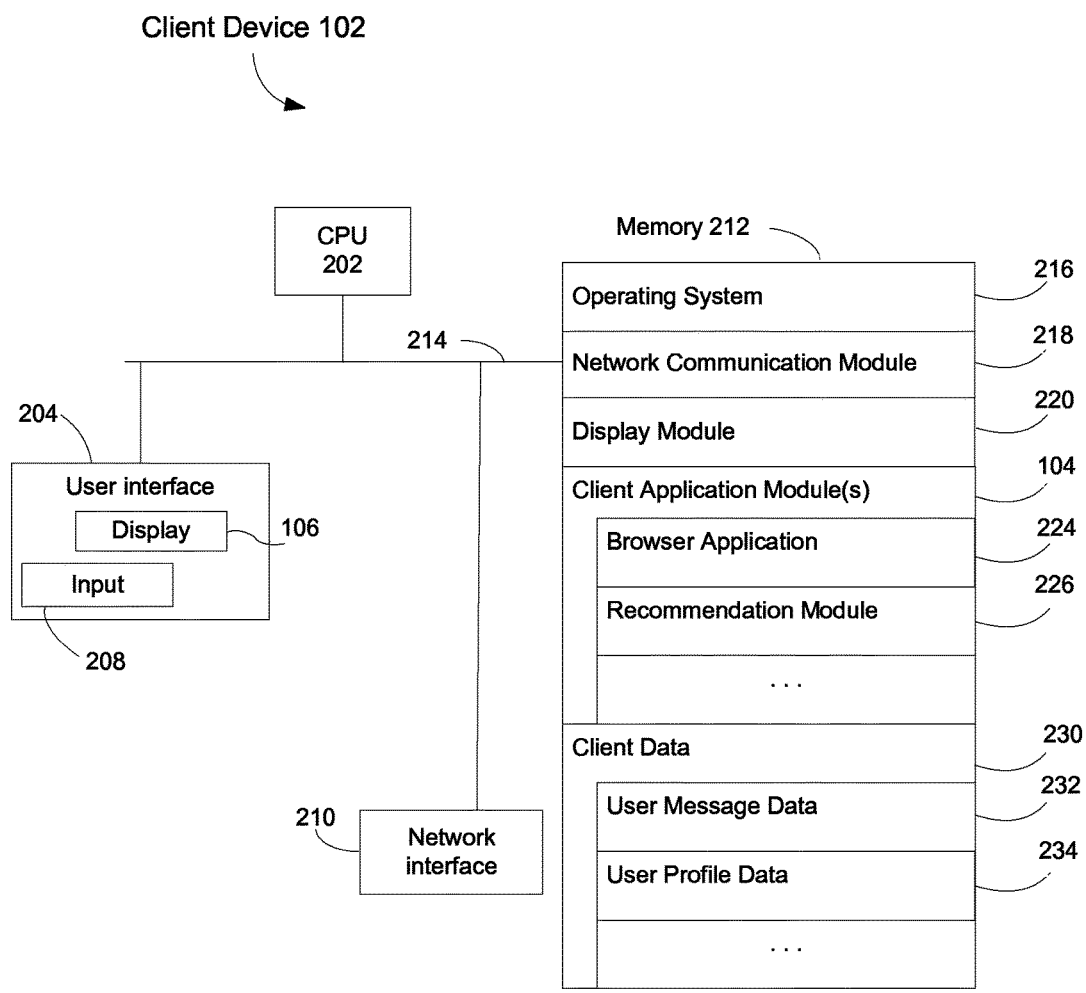
FIG. 2 is a block diagram illustrating a client system in accordance with some implementations.

FIG. 2 is a block diagram illustrating a client system 102, in accordance with some implementations. The client system 102 typically includes one or more processing units (CPU's) 202, one or more network interfaces 210, memory 212, and one or more communication buses 214 for interconnecting these components. The client system 102 includes a user interface 204. The user interface 204 includes an associated display device 104 and optionally includes an input means such as a keyboard, mouse, a touch sensitive display, or other input buttons 208. Optionally, the display device 106 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of media content on a display 106 associated with the client system 102;
- one or more client system 102 applications module(s) 104 for enabling the client system 102 to perform the functions offered by the client system 102, including but not limited to:
  - a browser application 224 for sending indications of purchasing intent to a server system (FIG. 1, 120) and displaying the information (for example web pages) returned by the server system (FIG. 1, 120) or a smart phone or other computer system application that performs the same function;
  - a recommendation module 226 for enabling a user to send a request for a recommendation to a server system (FIG. 1, 120), receiving a message requesting a recommendation from another user from the server system (FIG. 1, 120), selecting a good or service to recommend to another user, and transmitting the recommendation information to the server system (FIG. 1, 120); and
- one or more client data module(s) 230 for storing data related to the client system 102, including but not limited to:
  - client message data 232, including data representing messages to be sent to the server system (FIG. 1, 120) and messages received from the server system (FIG. 1, 120); and
  - user profile data 234, including information concerning users of the client system 102 such as a user profile, user preferences and interests, user contact information, and other information relevant to providing services to the user.

Figure 3:
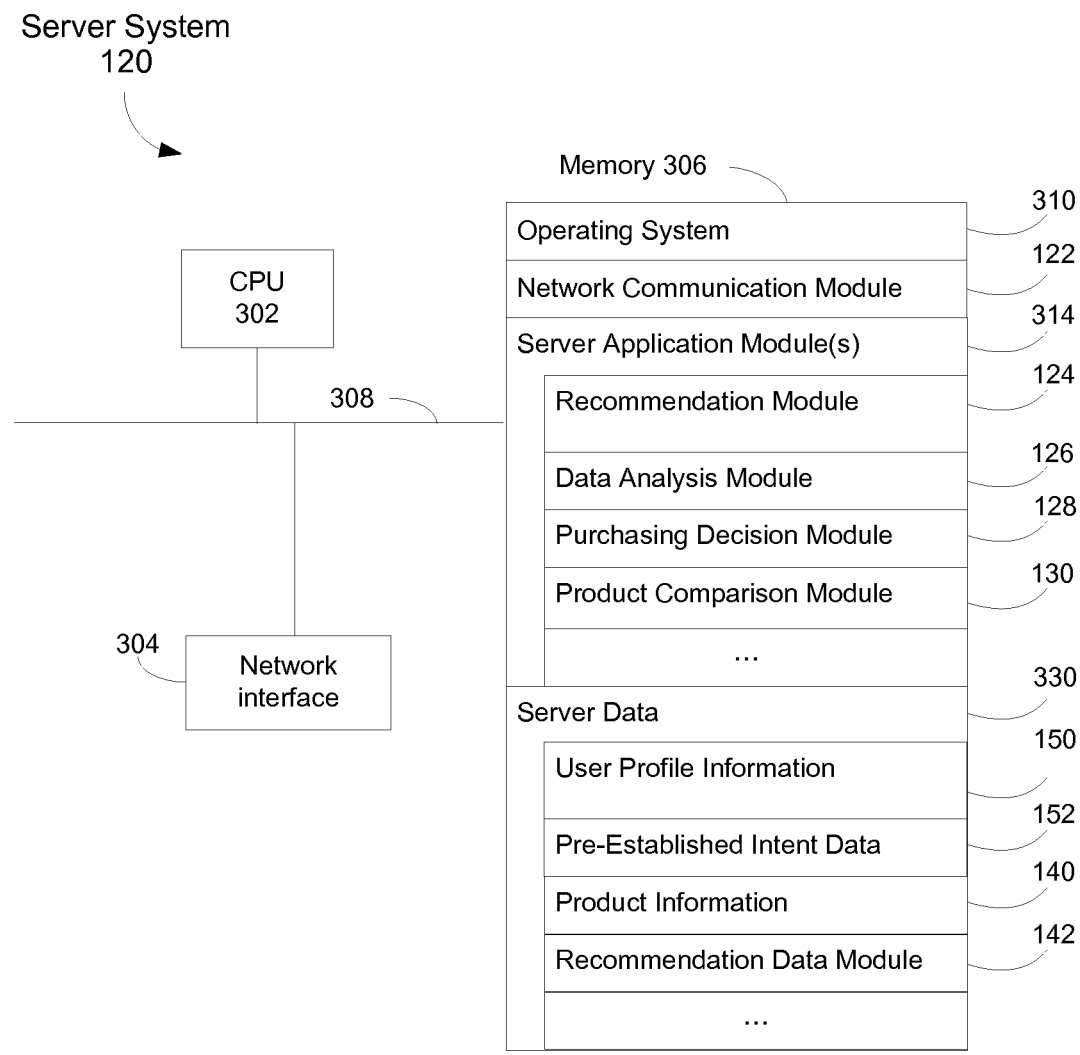
FIG. 3 is a block diagram illustrating a server system in accordance with some implementations.

FIG. 3 is a block diagram illustrating a server system 120, in accordance with some implementations. The server system 120 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 122 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 314 for enabling the server system 120 to perform the functions offered by the server system 120, including but not limited to:
  - a recommendation module 124 for determining recommendations to send to a client system (FIG. 1, 102), sending the recommendation, and receiving response messages (FIG. 1, 118) from client systems (FIG. 1, 102);
  - a data analysis module 126 for analyzing the text of a response message (FIG. 1, 118) to determine a user's intent and/or analyzing an indication of purchasing intent to determine the intent of a sender at a client system (FIG. 1, 102);
  - a purchasing decision module 128 for receiving a response message 118 from a client system (FIG. 1, 102) that indicates a user's intention to purchase a good or service through the server system (FIG. 1, 120) and for purchasing the good or service from one of the vendors (FIG. 1, 160); and
  - a product comparison module 130 for comparing products stored in the product database (FIG. 1, 140) and products stored as recommendations in the recommendation database 142 to determine if they are equivalent to a received indication of purchasing intent 114 or stored pre-established intent data; and
- one or more server data module(s) 330 for storing data related to the server system 120, including but not limited to:
  - user profile information database 150 including user preferences and interests, user contact information, and user history, including past user purchases, searches, page views, previous product recommendations, previous product reviews, social connections of the user, and any other information; related to the user;
  - pre-established intent data 152 including information describing, for each user of the server system 120, products and services that they have previously indicated an intent to purchase but that have not yet been purchased by the server system 12 on the user's behalf, and other information associated with the stored intent, such as budgets and time tables;
  - product information 140 including information for products that may be purchased through the server system 120, including, but not limited to, the price of the product, its features (size, color, etc), recent changes in price, and the vendor or vendors from which it is available; and
  - recommendation information 142 including a plurality of stored user-generated recommendations, the recommended products, where and how those products can be purchased, and product specifications.

Figure 4:
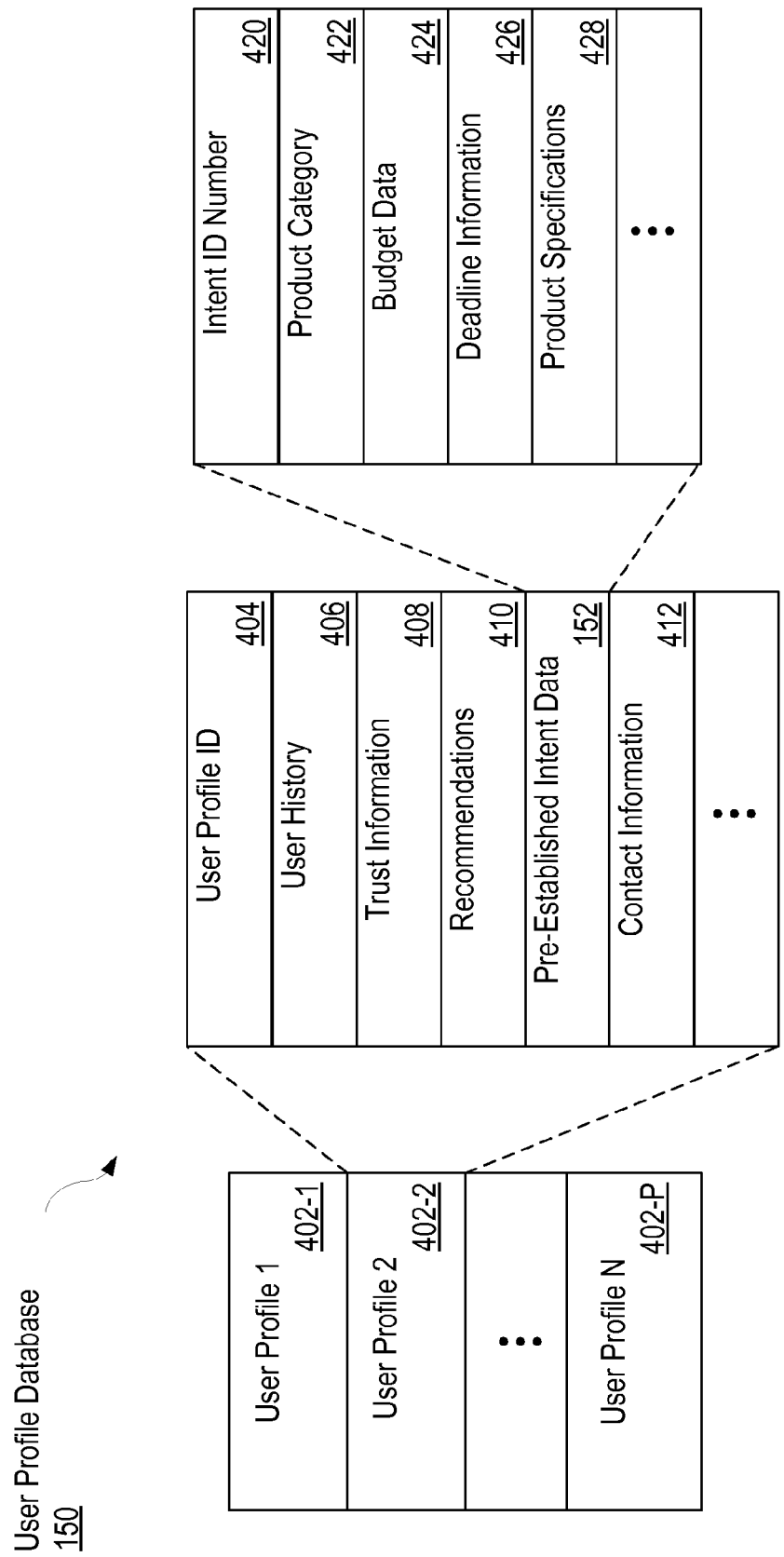
FIG. 4 depicts a block diagram of an exemplary data structure for a user profile database for storing information related to users of the server system.

FIG. 4 depicts a block diagram of an exemplary data structure for a user profile database 150 for storing information related to users of the server system (FIG. 1, 120). In accordance with some implementations, the user profile database 150 includes a plurality of user profiles 402-1 to 402-P, each of which corresponds to a user registered with the server system (FIG. 1, 120). In some implementations, each user profile 402 contains a user profile ID 404, a user history 406, trust information 408, recommendations 410 made by the user, user contact information 412, and pre-established intent data 152.

In some implementations, user profile ID 404 is a value that uniquely identifies a specific user of the server system (FIG. 1, 120). In some implementations, this value is chosen by the user and is a user name. In other implementations, this value is assigned to the user by the server system (FIG. 1, 120) as part of the registration process.

In some implementations, the user history 406 stores a history of the user's past interactions with the server system (FIG. 1, 120) including past user purchases, searches, page views, previous product recommendations, previous product reviews, and social connections of the user including previously recorded trust information for other users and/or social information received from social networking sites.

In some implementations, trust information 408 includes data describing the social connections of the user and includes a trust level for other users of the server system (FIG. 1, 120). A trust level is a value representing the degree to which a user trusts the opinions and recommendations of another user. In some implementations, trust information is explicitly submitted by the users, in other situations the server system (FIG. 1, 120) infers trust information from the actions of users, and in yet other situations trust information includes information from both user submissions and server inferences.

In some implementations, recommendation 410 data includes product purchases and product recommendations previously submitted by the user. In some implementations, contact information 412 includes a list of contact information for contacting the user through a plurality of communication methods and information describing if and when the server system (FIG. 1, 120) should use that method. For example, the contact information 412 includes an email address, a phone number, and a social network ID for the user. The user may select that the server system (FIG. 1, 120) should never use social network messaging to contact to user and should use email address at all times except for the weekend and that a text message to a mobile phone should be used on the weekend. In some implementations, the contact information 412 includes login and password information for one or more social networking sites.

In some implementations, pre-established intent data 152 is data previously submitted by the user indicating the user's intent to purchase a particular product. In some implementations, the pre-established intent data 142 includes intent ID number 420, product category 422, budget data 424, deadline information 426, and product specifications 428. In some implementations, the intent ID number 420 uniquely identifies each pre-established intent data record 142.

In some implementations, the product category 422 identifies the category of product to be purchased. In some implementations, the product category 422 can be very broad, such as men's pants, or very narrow, such as a racquetball racquet. In some implementations, budget data 424 includes an amount of money the user is willing to spend on the product identified by the pre-established intent data 152 record. In some implementations, a user profile 150 includes an overall budget for all purchases. In some implementations, the budget data 424 includes priority data to establish which products should be higher priority to purchase given the account budget. In some implementations, the budget data 424 represents a monthly or recurring budget.

In some implementations, deadline information 426 determines the time window in which the product can be purchased. In some implementations, there no time limit and the pre-established intent data 152 record is valid until a matching product is found. In some implementations, once the specified deadline has passed, the pre-established intent data record 152 is removed.

In some implementations, product specifications 428 include any criteria by which potential products can be distinguished, including the price range specified by the user, brands or vendors favored by the user, colors, styles, size of the product, options included with the product, the amount the price is currently discounted, quantity of the product available, material used to fabricate the product, the number of units, the pattern of the product design, whether the product is local, the level of service associated with the product, whether the vender allows custom modifications, whether the vendor allows special requests of any kind, whether the product comes with a warranty, the assembly status of the product (for example, pre-assembled, partially assembled, or unassembled), the artist or maker associated with the product, the format of the product, or the version of the product, and any other feature or characteristic that the user desires for the requested recommendation.

In some implementations, the product specifications 428 can include preferences for delivery options such as the speed of delivery, the delivery provider, the delivery service provider, delivery insurance availability, the delivery period, white glove delivery options, in store pick-up options, method of delivery (electronic or physical), the return policy, the pre-order policy, or any other delivery option that may be preferred by a user.

In some implementations, the product specifications 428 include gift options such as the availability to ship to multiple addresses, whether the product can be gift-wrapped, whether a gift note or card can be included, and whether a gift receipt is available. In some implementations one or more of the user preferences 412 can be mandatory features for any recommended product. In some implementations, the product specifications 428 are compared against information stored in the product database, wherein the product database includes the same categories of information as the product specification 428.

Figure 5:
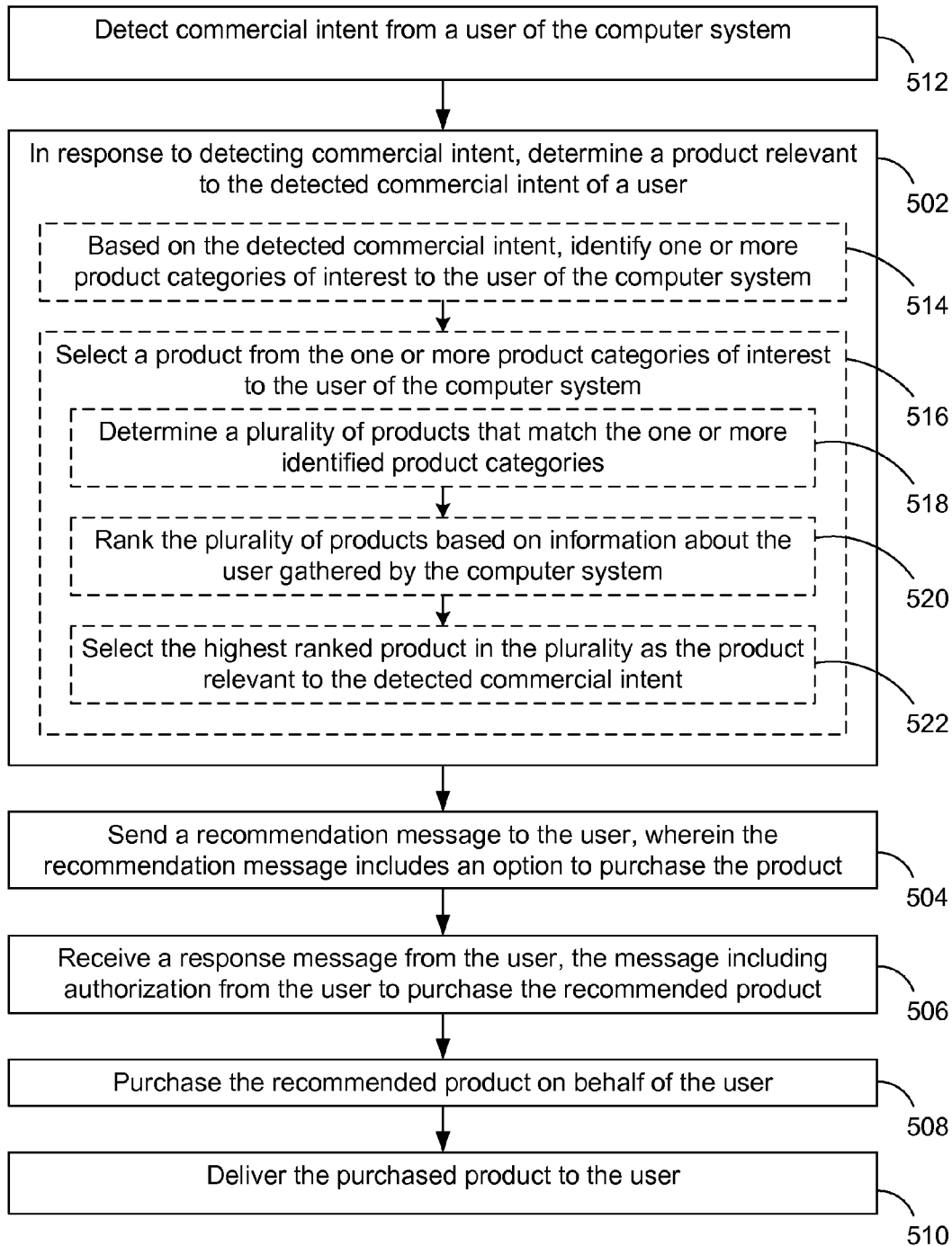
FIG. 5 is a flow diagram illustrating the process for clickless purchasing in accordance with some implementations.

FIG. 5 is a flow diagram illustrating the process for clickless purchasing in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the server system (FIG. 1, 120).

In some implementations, the server system (FIG. 1, 120) detects commercial intent from a user registered with the server system (FIG. 1, 120) (512). In some implementations, detecting commercial intent includes recording and analyzing the online actions of a user registered with the server system (FIG. 1, 120), including by not limited to page views, clicks, searches, and n some implementations, information posted publicly on social networking sites and comments posted in general. In some implementations, the server system (FIG. 1, 120) only records online actions if the user has explicitly given permission to the server system (FIG. 1, 120) to do so. In accordance with some implementations, the server system (FIG. 1, 120) determines a product relevant to a user (502). In some implementations, the relevant product is determined by receiving a user-generated recommendation and matching it to the user's preferences. In some implementations, the relevant product is determined in response to a specific request from the user. In some implementations, a product is determined relevant to a user based on the selection by an editor or product manager associated with the server system (FIG. 1, 120).

In some implementations, when determining a product relevant to the detected commercial intent, the server system (FIG. 1, 120) identifies one or more product categories of interest to the user of the server system based on the detected commercial intent (514). For example, if the detected commercial intent is based on the user browsing websites that specialize in selling camping gear, the server system (FIG. 1, 120) determines that identify tents, backpacks, and sleeping bags as relevant product categories. In some implementations, the server system (FIG. 1, 120) selects a product from the one or more product categories of interest to the user of the computer (518). In some implementations, selecting a product from the one or more product categories includes the server system (FIG. 1, 120) determining a plurality of products that match the one or more identified product categories. For example, the server system (FIG. 1, 120) generates a list of camping backpacks, tents, and sleeping bags.

In some implementations, the server system (FIG. 1, 120) ranks the plurality of products based on information about the user gathered by the computer system (520). For example, the server system (FIG. 1, 120) uses information concerning the users past browsing and purchasing histories, web searches, recommendations, and any other important information that can be used to evaluate and rank potential products. In some implementations, the server system (FIG. 1, 120) selects the highest ranked product in the plurality as the product relevant to the detected commercial intent 522.

In some implementations, the server system (FIG. 1, 120) sends a recommendation message to the user, wherein the recommendation message includes an option to purchase the recommended product (504). In some implementations, the recommendation message is sent as an email message. In other implementations, the recommendation message is sent as a text message. In yet other implementations, the recommendation message is sent by any method convenient to the user including, but not limited to, a voice mail, an instant message via an instant messaging service, a letter, or a message on a social networking platform such as Facebook or LinkedIn.

In accordance with some implementations, the server system (FIG. 1, 120) receives a response message from the user, the response message including authorization from the user to purchase the recommended product (506). In some implementations, the response message includes the ID of the user, a value identifying the recommendation to which the user is responding, and an indication that the user wishes to purchase the product. In some implementations, the response message is sent as an email message. In some implementations, the response message is sent as a text message. In some implementations, the response message is sent using a different communication method than the recommendation method. For example, the server system (FIG. 1, 120) sends a recommendation message as a text message.

The user sends a response message as an email address, including information that identifies the user, the product to be purchased, and in some implementations, the purchasing method and the delivery method preferences.

In some implementations, in response to receiving the response message, the sever system (FIG. 1, 120) purchases the recommended product on behalf of the user (508). In accordance with some implementations, the server system (FIG. 1, 120) then arranges for the delivery of the purchased product to the user (510).

Figure 6:
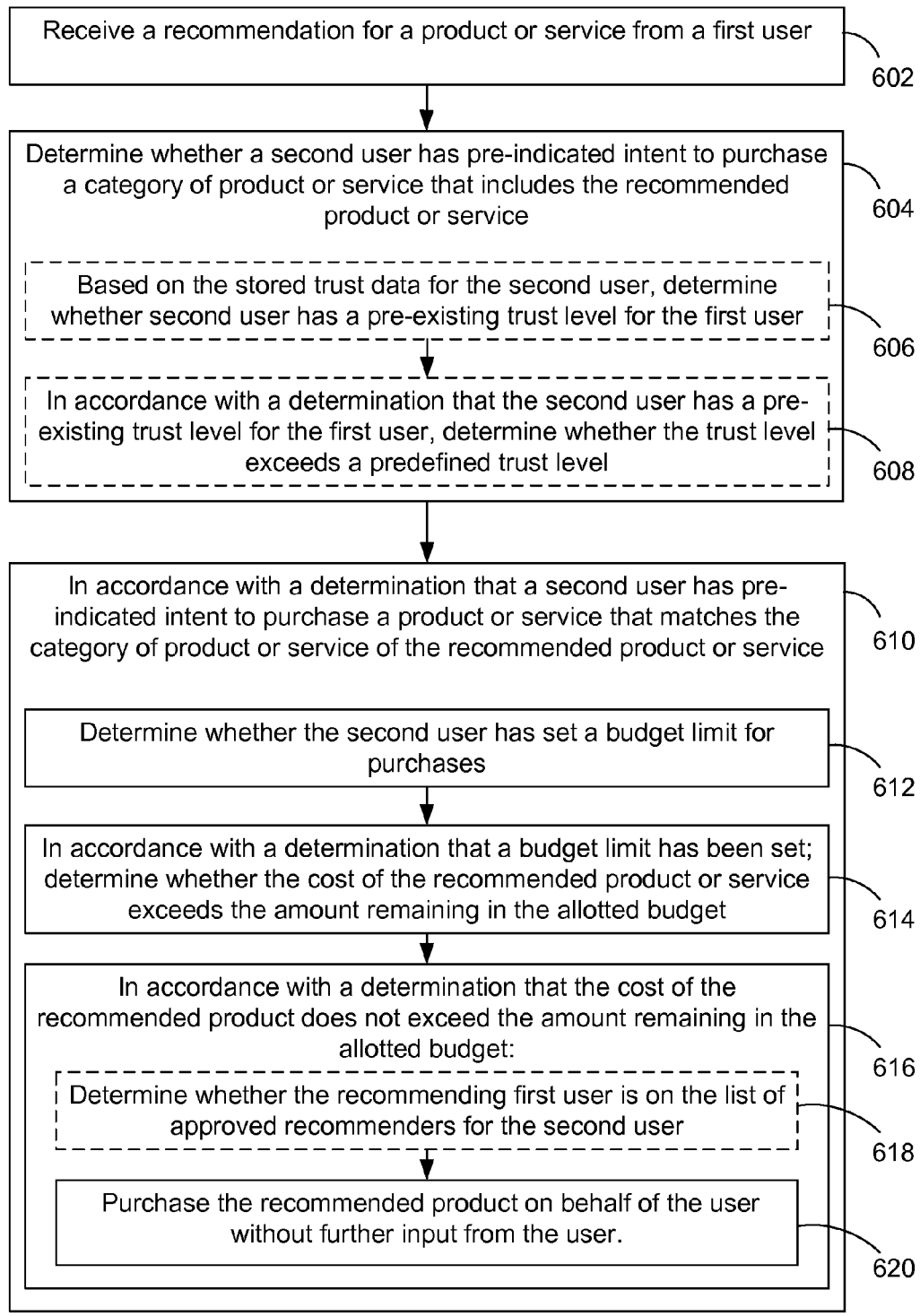
FIG. 6 is a flow diagram illustrating the process for using recommendations to fulfill pre-established intent in accordance with some implementations.

FIG. 6 is a flow diagram illustrating the process for using recommendations to fulfill pre-established intent in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 120).

In accordance with some implementations, the server system (FIG. 1, 120) receives a recommendation for a product or service from a first user (602). In some implementations, the server system (FIG. 1, 120) determines whether a second user has pre-indicated intent to purchase a product or service in a category of product or service that includes the recommended product or service (604). In some implementations, the server system (FIG. 1, 120) stores trust information for both the first user and the second user.

In accordance with some implementations, the server system (FIG. 1, 120), based on the stored trust data for the second user, determines whether second user has a pre-existing trust level for the first user (606). In accordance with some implementations, the server system (FIG. 1, 120), in accordance with a determination that the second user has a pre-existing trust level for the first user, determines whether the trust level exceeds a predefined trust level (608). In accordance with a determination that the trust level from the second user to the first user does not exceed the pre-defined trust level, the server system (FIG. 1, 120) ignores the recommendation. Thus, in some implementations, the server system (FIG. 1, 120) will only purchase products on behalf of the second user based on recommendations from users the second user trusts. In some implementations, users can indicate trust in specific product categories. Then, the server system (FIG. 1, 120) will only purchase products in a specific category on behalf of the second user based on recommendations from users the second user trusts in that specific category.

In some implementations, in accordance with a determination that a second user has pre-indicated intent to purchase a product or service that matches the category of product or service of the recommended product or service (610), the server system (FIG. 1, 120) determines whether the second user has set a budget limit for purchases (612). In some implementations, a separate budget is set for each pre-established purchasing intent record. In other implementations, a user sets a budget for all purchases and ranks pre-established purchasing intent records by priority.

In some implementations, each user of the server system (FIG. 1, 120) has an associated list of approved recommenders. In some implementations, in accordance with some implementations, the server system (FIG. 1, 120), in accordance with a determination that a budget limit has been set; determines whether the cost of the recommended product or service exceeds the amount remaining in the allotted budget (614). In accordance with a determination that the cost of the recommended product does not exceed the amount remaining in the allotted budget, the server system (FIG. 1, 120) determines whether the recommending first user is on the list of approved recommenders for the second user (616). If the recommending user is on the second users approved recommenders list, the server system (FIG. 1, 120) purchases the recommended product on behalf of the user without further input from the user (616).

Figure 7:
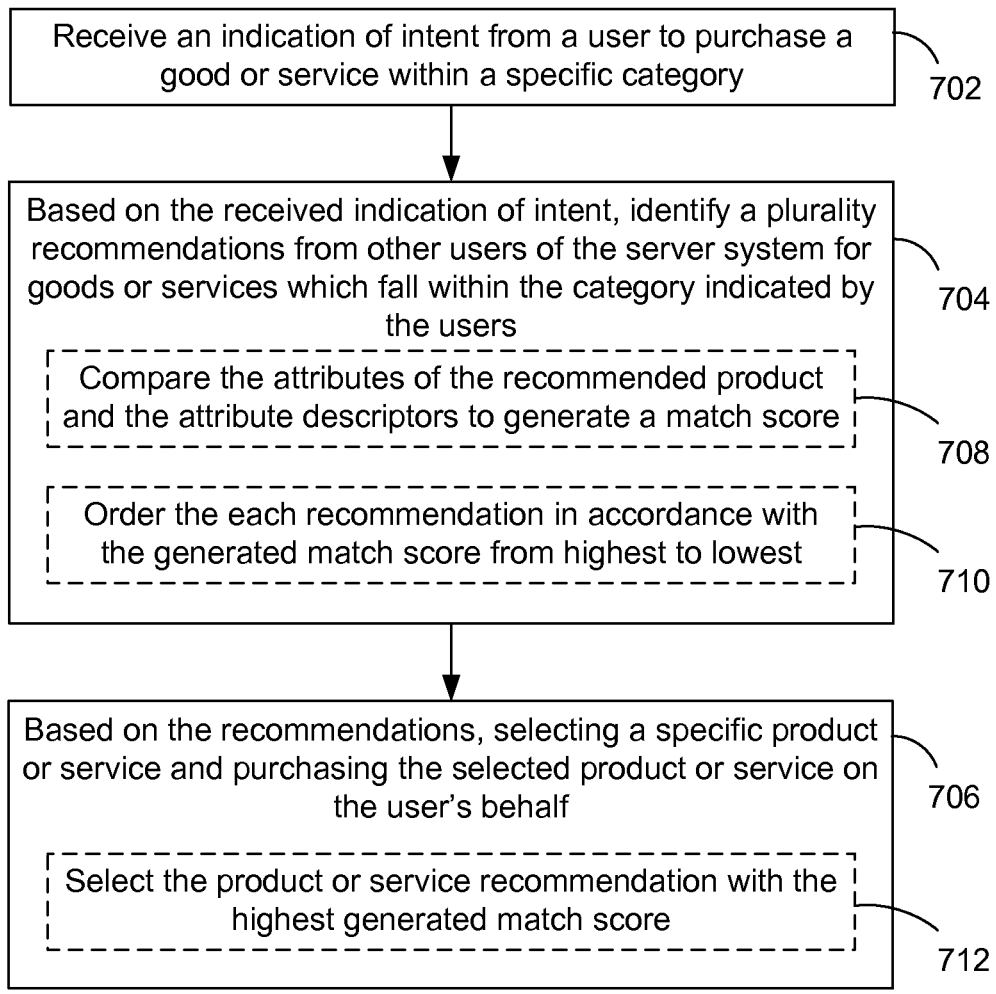
FIG. 7 is a flow diagram illustrating the process for responding to commercial intent from a user in accordance with some implementations.

FIG. 7 is a flow diagram illustrating the process for responding to commercial intent from a user in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIG. 1, 120).

In accordance with some implementations, the server system (FIG. 1, 120), receives an indication of intent from a user to purchase a good or service within a specific category (702). In some implementations, based on the received indication of intent, the server system (FIG. 1, 120) identifies recommendations from other users of the server system for goods or services that fall within the category indicated by the users (704). In some implementations, the server system (FIG. 1, 120) requests recommendations from other users of the server system (FIG. 1, 120) in response to the received intent to purchase. In some implementations, the indication of intent includes a list of product attributes that describe the product the user desires to purchase. In some implementations, each product attribute has a value associated with the product attribute. For example, if the indication of intent includes a list of attribute values that include size, type, and color, the attributes may have values such a type: men's shoes, size: 12, and color: brown.

In some implementations, the server system (FIG. 1, 120) compares the list of the product attributes included in the indication of intent with the product attributes of the products or services included in each recommendation in the plurality of recommendations (708). In some implementations, the server system (FIG. 1, 120) generates a match score for each respective recommendation in the plurality of recommendations based on the comparison of the product attributes included in the indication of intent with the product attributes of the products or services included in each respective recommendation in the plurality of recommendations. The match score represents a measurement of how many of attributes the product or service included in the respective recommendation are also included in the indication of intent and how closely the attributes value match.

In some implementations, the server system (FIG. 1, 120) orders the plurality of recommendations based on the generated match scores (710), such that the highest match score (e.g., the best match) is listed first and the lowest match score (e.g., the worst match) is listed last.

In some implementations, the server system (FIG. 1, 120), based on the recommendations, selects a specific product or service and purchases the selected product or service on the user's behalf. In some implementations, the server system (FIG. 1, 120) selects the product based on the whether the user who submitted the indication of intent has a recorded trust level for the user who submits the recommendation. In some implementations, the server system (FIG. 1, 120) selects the product or service with the highest generated match score (712). In some implementations, the user has a trust level for more than one submitter, and the server system (FIG. 1, 120) selects the recommendation associated with the submitter that is most trusted by the user.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for enabling clickless purchasing, the method comprising, at a computer system comprising one or more processors and memory storing one or more programs for execution by the one or more processors:
   detecting a commercial intent from a user registered with the computer system by:
      recording online actions of the user, the online actions of the user comprising at least one electronic message posted by the user on a social networking site, wherein the at least one electronic message, includes the commercial intent of the user;
      and
      analyzing the at least one electronic message by parsing, natural language of the at least one electronic message;
   in response to detecting the commercial intent, determining a product relevant to the detected commercial intent of the user;
   sending an electronic recommendation message to a client system associated with the user, wherein the electronic recommendation message comprises an option to purchase the product determined to be relevant to the detected commercial intent of the user;
   receiving an electronic response message from the client system associated with the user, the electronic response message comprising an authorization from the user to purchase the product determined to be relevant to the detected commercial intent of the user;
   in response to receiving the electronic response message comprising the authorization from the user to purchase the product, purchasing the product determined to be relevant to the detected commercial intent of the user on behalf of the user; and
   arranging for delivery of the product to the user after purchasing the product.

2. The method of claim 1, wherein the electronic recommendation message comprises an email message.

3. The method of claim 1, wherein the electronic recommendation message comprises a text message.

4. The method of claim 1, wherein the electronic response message received from the user comprises an email message.

5. The method of claim 1, wherein the electronic response message received from the user comprises a text message.

6. The method of claim 1, wherein:
   a communication method used to send the electronic recommendation message to the user is different from a communication method the user uses to send the electronic response message to the computer system;
   the electronic response message is encrypted; and
   the method further comprises identifying the user based on metadata associated with the electronic response message.

7. The method of claim 1, wherein determining the product relevant to the detected commercial intent of the user comprises:
   based on the detected commercial intent, identifying one or more product categories of interest to the user of the computer system; and
   selecting the product from the one or more product categories of interest to the user of the computer system.

8. The method of claim 7, wherein selecting the product from the one or more product categories of interest to the user of the computer system comprises:
   determining a plurality of products that match the one or more identified product categories;
   ranking the plurality of products based on information about the user gathered by the computer system; and
   selecting a highest ranked product in the plurality of products as the product relevant to the detected commercial intent.

9. The method of claim 1, wherein:
   detecting the commercial intent comprises analyzing information publicly posted by the user on the social networking site;
   the electronic recommendation message is encrypted and comprises one of an email message or a text message;
   the electronic response message received from the user comprises one of an email message or a text message;
   determining the product relevant to the detected commercial intent of the user comprises:
      based on the detected commercial intent, identifying one or more product categories of interest to the user of the computer system; and
      selecting the product from the one or more product categories of interest to the user of the computer system;

selecting the product from the one or more product categories of interest to the user of the computer system comprises:
   determining a plurality of products that match the one or more identified product categories;
   ranking the plurality of products based on the information about the user gathered by the computer system; and
   selecting a highest ranked product in the plurality of products as the product relevant to the detected commercial intent; and
the method further comprises identifying the user based on metadata associated with the electronic response message.

10. The method of claim 1, further comprising:
receiving an indication of a purchase intent from the user prior to sending the electronic recommendation message to the client system associated with the user.

11. A server system for enabling clickless purchasing, the server system comprising:
one or more processors; and
memory storing one or more programs to be executed by the one or more processors, the one or more programs comprising instructions for:
   detecting a commercial intent from a user registered with a computer system by:
      recording online actions of the user, the online actions of the user comprising at least one electronic message posted by the user on a social networking site, wherein the at least one electronic message, includes the commercial intent of the user; and
      analyzing the at least one electronic message by parsing natural language of the at least one electronic;
   in response to detecting the commercial intent, determining a product relevant to the detected commercial intent of the user;
   sending an electronic recommendation message to a client system associated with the user, wherein the electronic recommendation message comprises an option to purchase the product;
   receiving an electronic response message from the client system associated with the user, the electronic response message comprising an authorization from the user to purchase the product;
   in response to receiving the electronic response message comprising the authorization from the user to purchase the product, purchasing the product on behalf of the user; and
   arranging for delivery of the product to the user after purchasing the product.

12. The server system of claim 11, wherein a communication method used to send the electronic recommendation message to the user is different from a communication method the user uses to send the electronic response message to the computer system.

13. The server system of claim 11, wherein determining the product relevant to the detected commercial intent of the user comprises:
based on the detected commercial intent, identifying one or more product categories of interest to the user of the computer system; and
selecting the product from the one or more product categories of interest to the user of the computer system.

14. The server system of claim 13, wherein selecting the product from the one or more product categories of interest to the user of the computer system comprises:
determining a plurality of products that match the one or more identified product categories;
ranking the plurality of products based on information about the user gathered by the computer system; and
selecting a highest ranked product in the plurality of products as the product relevant to the detected commercial intent.

15. The server system of claim 11, wherein:
detecting the commercial intent comprises analyzing information publicly posted by the user on the social networking site;
a communication method used to send the electronic recommendation message to the user is different from a communication method the user uses to send the electronic response message to the computer system;
determining the product relevant to the detected commercial intent of the user comprises:
   based on the detected commercial intent, identifying one or more product categories of interest to the user of the computer system; and
   selecting the product from the one or more product categories of interest to the user of the computer system; and
selecting the product from the one or more product categories of interest to the user of the computer system comprises:
   determining a plurality of products that match the one or more identified product categories;
   ranking the plurality of products based on the information about the user gathered by the computer system; and
   selecting a highest ranked product in the plurality of products as the product relevant to the detected commercial intent.

16. The server system of claim 11, wherein the one or more programs further comprise instructions for:
receiving an indication of a purchase intent from the user prior to sending the electronic recommendation message to the client system associated with the user.

17. A non-transitory computer readable storage medium storing one or more programs configured for execution by an electronic device, the one or more programs comprising instructions for:
detecting a commercial intent from a user registered with a computer system by:
   recording online actions of the user, the online actions of the user comprising at least one electronic message posted by the user on a social networking site, wherein the at least one electronic message, includes the commercial intent of the user;
   analyzing the at least one electronic message by parsing natural language of the at least one electronic message;
in response to detecting the commercial intent, determining a product relevant to the detected commercial intent of the user;
sending an electronic recommendation message to a client system associated with the user, wherein the electronic recommendation message includes an option to purchase the product;
receiving an electronic response message from the client system associated with the user, the electronic response message comprising an authorization from the user to purchase the product;

in response to receiving the electronic response message comprising the authorization from the user to purchase the product, purchasing the product on behalf of the user; and arranging for delivery of the product to the user after purchasing the product.

18. The non-transitory computer readable storage medium of claim 17, wherein a communication method used to send the electronic recommendation message to the user is different from a communication method the user uses to send the electronic response message to the computer system.

19. The non-transitory computer readable storage medium of claim 17, wherein determining the product relevant to the detected commercial intent of the user comprises:

based on the detected commercial intent, identifying one or more product categories of interest to the user of the computer system; and selecting the product from the one or more product categories of interest to the user of the computer system.

20. The non-transitory computer readable storage medium of claim 19, wherein selecting the product from the one or more product categories of interest to the user of the computer system comprises:

determining a plurality of products that match the one or more identified product categories;

ranking the plurality of products based on information about the user gathered by the computer system; and selecting a highest ranked product in the plurality of products as the product relevant to the detected commercial intent.

21. The non-transitory computer readable storage medium of claim 17, wherein:

detecting the commercial intent comprises analyzing information publicly posted by the user on the social networking site;

a communication method used to send the electronic recommendation message to the user is different from a communication method the user uses to send the electronic response message to the computer system;

determining the product relevant to the detected commercial intent of the user comprises:

based on the detected commercial intent, identifying one or more product categories of interest to the user of the computer system; and selecting the product from the one or more product categories of interest to the user of the computer system; and selecting the product from the one or more product categories of interest to the user of the computer system comprises:

determining a plurality of products that match the one or more identified product categories;

ranking the plurality of products based on the information about the user gathered by the computer system; and selecting a highest ranked product in the plurality of products as the product relevant to the detected commercial intent.

22. The non-transitory computer readable storage medium of claim 17, wherein the one or more programs further comprise instructions for:

receiving an indication of a purchase intent from the user prior to sending the electronic recommendation message to the client system associated with the user.

\* \* \* \* \*